United States Patent
Sung et al.

(10) Patent No.: US 8,175,111 B2
(45) Date of Patent: May 8, 2012

(54) APPARATUS AND METHOD FOR RELAY BETWEEN NETWORKS

(75) Inventors: Min-young Sung, Seoul (KR); Sang-bum Suh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 677 days.

(21) Appl. No.: 11/166,193

(22) Filed: Jun. 27, 2005

(65) Prior Publication Data

US 2005/0286557 A1    Dec. 29, 2005

(30) Foreign Application Priority Data

Jun. 25, 2004   (KR) .................. 10-2004-0048283

(51) Int. Cl.
    *H04J 3/16*   (2006.01)
(52) U.S. Cl. ......... 370/466; 370/252; 370/400; 370/401
(58) Field of Classification Search .................. 370/401, 370/466, 465, 467, 471, 250, 252, 350, 400, 370/474, 235, 360, 394; 375/220, 222; 455/557, 455/442, 12.1, 418; 710/18, 52, 53, 55, 56, 710/57, 61
    See application file for complete search history.

(56) References Cited

U.S. PATENT DOCUMENTS

| | | | | |
|---|---|---|---|---|
| 5,276,732 A * | 1/1994 | Stent et al. | ................ | 379/93.08 |
| 5,313,457 A * | 5/1994 | Hostetter et al. | ............ | 370/320 |
| 5,970,088 A * | 10/1999 | Chen | ............................ | 375/222 |
| 6,088,385 A * | 7/2000 | Liu | ................................ | 375/219 |
| 6,188,720 B1 * | 2/2001 | Batzer et al. | ................... | 375/222 |
| 6,192,070 B1 * | 2/2001 | Poon et al. | ..................... | 375/222 |
| 6,243,394 B1 * | 6/2001 | Deng | ............................. | 370/466 |
| 6,329,930 B1 * | 12/2001 | Parsadayan | ................... | 340/933 |
| 6,363,426 B1 * | 3/2002 | Yon et al. | ...................... | 709/226 |
| 6,366,297 B1 * | 4/2002 | Feagans | ....................... | 715/736 |
| 6,389,029 B1 * | 5/2002 | McAlear | ....................... | 370/402 |
| 6,418,203 B1 * | 7/2002 | Marcie | ....................... | 379/90.01 |
| 6,452,910 B1 * | 9/2002 | Vij et al. | ........................ | 370/310 |
| 6,631,429 B2 * | 10/2003 | Cota-Robles et al. | .......... | 710/52 |
| 6,643,262 B1 * | 11/2003 | Larsson et al. | ................ | 370/236 |
| 6,681,121 B1 * | 1/2004 | Preston et al. | ............. | 455/556.1 |
| 7,068,971 B2 * | 6/2006 | Abutaleb et al. | ............. | 455/3.02 |
| 7,106,788 B1 * | 9/2006 | Mueller et al. | ................ | 375/222 |
| 7,158,525 B2 * | 1/2007 | Daffner et al. | ................ | 370/401 |
| 7,272,413 B2 * | 9/2007 | Yu | ............................. | 455/552.1 |
| 7,319,715 B1 * | 1/2008 | Souissi et al. | ................. | 375/220 |
| 7,401,015 B1 * | 7/2008 | Bailey et al. | .................... | 703/23 |

(Continued)

FOREIGN PATENT DOCUMENTS

CN   1300010 A   6/2001

(Continued)

*Primary Examiner* — Chi Pham
*Assistant Examiner* — Abdullah Riyami
(74) *Attorney, Agent, or Firm* — Sughrue Mion, PLLC

(57) ABSTRACT

A network relay apparatus and method using a software module that easily support various network protocols and new network protocols. The network relay apparatus includes a first modem unit communicating with a first network using a first protocol, a second modem unit communicating with a second network using a second protocol, a bridge unit converting data to be suitable for the first and second protocols when the data is exchanged between the first modem unit and the second modem unit, and a controller generating the first and second modem units and the bridge unit in a software manner.

7 Claims, 7 Drawing Sheets

U.S. PATENT DOCUMENTS

| | | | |
|---|---|---|---|
| 2001/0039573 A1* | 11/2001 | Collin et al. | 709/220 |
| 2002/0068608 A1* | 6/2002 | Souissi | 455/557 |
| 2002/0137514 A1* | 9/2002 | Mitsugi et al. | 455/436 |
| 2003/0033457 A1* | 2/2003 | Faist | 710/62 |
| 2003/0070012 A1* | 4/2003 | Cota-Robles et al. | 710/57 |
| 2003/0226149 A1* | 12/2003 | Chun et al. | 725/78 |
| 2004/0008761 A1* | 1/2004 | Kelliher et al. | 375/222 |
| 2004/0019675 A1* | 1/2004 | Hebeler et al. | 709/224 |
| 2004/0032871 A1* | 2/2004 | Sharon et al. | 370/400 |
| 2004/0047407 A1* | 3/2004 | Fisher et al. | 375/222 |
| 2004/0093436 A1* | 5/2004 | Colnot | 710/1 |
| 2004/0174858 A1* | 9/2004 | Caspi et al. | 370/351 |
| 2004/0174967 A1* | 9/2004 | Liang et al. | 379/93.35 |
| 2005/0080932 A1* | 4/2005 | Liu | 709/249 |
| 2005/0083967 A1* | 4/2005 | Yu | 370/465 |
| 2005/0117603 A1* | 6/2005 | Binder | 370/466 |
| 2005/0175031 A1* | 8/2005 | Harley | 370/466 |
| 2006/0003757 A1* | 1/2006 | Subramanian et al. | 455/418 |
| 2006/0023684 A1* | 2/2006 | Seo et al. | 370/338 |
| 2006/0133414 A1* | 6/2006 | Luoma et al. | 370/466 |
| 2006/0159244 A1* | 7/2006 | Olafsson et al. | 379/93.32 |
| 2006/0209795 A1* | 9/2006 | Chow et al. | 370/352 |
| 2007/0171878 A1* | 7/2007 | Souissi et al. | 370/338 |
| 2007/0218870 A1* | 9/2007 | Satoh | 455/404.2 |
| 2007/0237311 A1* | 10/2007 | Ofir et al. | 379/90.01 |

FOREIGN PATENT DOCUMENTS

| | | |
|---|---|---|
| KR | 10-2001-0019841 A | 3/2001 |
| KR | 2003-0062732 A | 7/2003 |

* cited by examiner

FIG. 5A

```
BRIDGE_MODULE brg_802_3__802_11b{
    PACKET_QUEUE que1_rx, que1_tx;
    PACKET_QUEUE que2_rx, que2_tx;

MODEM_MODULE ieee_802_3u mod1;
    MODEM_MODULE ieee_802_11b mod2;

PROCEDURE initialize(){
        mod1->setup(que1_rx, que1_tx);
        mod2->setup(que2_rx, que2_tx);
    }
    PROCEDURE work();
    ...
        }
```

FIG. 5B

```
MODEM_MODULE mdm_ieee_802_11b {
    PROCEDURE setup(PACKET_QUEUE rxq, PACKET_QUEUE txq);
    ...
}

PROCEDURE mdm_ieee_802_11b::setup(PACKET_QUEUE rxq,
PACKET_QUEUE txq) {
    MODULE_SOURCE      source;
    MODULE_FIR         ch_filter;
    MODULE_QPSK_DEMOD  demod;
    MODULE_CSMA_CA     mac;
    ...
    CONNECT_MODULE(source, ch_filter);
    CONNECT_MODULE(ch_filter, demod);
    CONNECT_QUEUE(mac, rxq);
    ...
}
```

APPARATUS AND METHOD FOR RELAY BETWEEN NETWORKS

CROSS-REFERENCE TO RELATED APPLICATION

This application claims priority from Korean Patent Application No. 10-2004-0048283 filed on Jun. 25, 2004 in the Korean Intellectual Property Office, the disclosure of which is incorporated herein by reference in its entirety.

BACKGROUND OF THE INVENTION

1. Field of the Invention

The present invention relates to an apparatus and method for relay between networks, and more particularly, to a network relay apparatus and method using a software module.

2. Description of the Related Art

With the recent spread of various local area networks (LANs) and wired/wireless Internet networks, a home network has been studied. The home network allows household appliances to communicate with each other so that the household appliances are operated using only a single remote control and can use digital audio/video data through the Internet.

A home network can be operated using various protocols according to the characteristics of household appliances, i.e., nodes in a network. For example, Home Audio Video interoperability (HAVi), i.e., a communication standard based on an Institute of Electrical and Electronics Engineers (IEEE)1394 digital interface standard, is used to process digital audio/video data at high speed. However, Universal Plug & Play (UPnP) is used for personal computer (PC)-based household appliances. A Home Network Control Protocol (HNCP) based on low-speed Power Line Communication (PLC) may be used for household appliances such as refrigerators, air conditioners, and washing machines that operate at relatively low speed.

A home network might be constructed using only one protocol, but it is rare that people buy all household appliances using the same protocol. Since each of various protocols has its own advantages and disadvantages, it is usual that people buy household appliances using different protocols according to the appliances' characteristics. In this situation, appliances using the same protocol can communicate with each other, but appliances using different protocols cannot directly communication with each other.

Accordingly, in order to allow appliances using different protocols to efficiently communicate with each other, a network relay apparatus such as a bridge or a router that relays communication between networks is required.

FIG. 1 illustrates an example of a home network including two different sub-networks.

The home network includes a sub-network 110 using an IEEE802.11 protocol (referred to as an IEEE802.11 network 110), a sub-network 120 using a Bluetooth protocol (referred to as a Bluetooth network 120), and a network relay apparatus 130 relaying communication between the two sub-networks 110 and 120.

The network relay apparatus 130 includes a first modem unit 132 operating for communication with the IEEE802.11 network 110 and a second modem unit 134 operating for communication with the Bluetooth network 120.

When a personal digital assistant (PDA) 112 included in the IEEE802.11 network 110 transmits data to a printer 122 included in the Bluetooth network 120, data packets are transmitted first to the first modem unit 132 included in the network relay apparatus 130. The first modem unit 132 functions as a physical (PHY) layer and a medium access control (MAC) layer in a hierarchical architecture of the network relay apparatus 130. The data packets are processed by the first modem unit 132 and then transmitted to a logical link control (LLC) layer 136.

The LLC layer 136 converts addresses included in the data packets received from the first modem unit 132 using an address mapping table for network devices included in the sub-networks 110 and 120.

Thereafter, the data is transmitted to the second modem unit 134. The second modem unit 134 also functions as the PHY layer and the MAC layer. The second modem unit 134 encapsulates the data received from the LLC layer 136 in accordance with the Bluetooth protocol and then transmits the encapsulated data to the printer 122.

There are two conventional methods of configuring a network relay apparatus. In one method, the network relay apparatus is entirely configured in hardware using modem hardware. In the other method, a MAC layer and a PHY layer are configured in hardware (i.e., modem hardware), and an LLC layer is configured in a software manner. In particular, according to the latter method, a network interface card (NIC) functioning as modem hardware is usually installed in an inexpensive PC to drive software of the network relay apparatus.

However, conventional technology is limited in configuration of a network relay apparatus and needs a large amount of cost when many various protocols need to be supported in a sub-network or when a new network protocol needs to be supported after the network relay apparatus is configured and installed.

For example, when a network relay apparatus is entirely configured in hardware, separate network relay apparatuses are needed for sub-network protocol combinations, respectively. In addition, when a sub-network using a new protocol is added to an existing home network, as many network relay apparatuses as the sub-network protocols used in the existing home network are additionally needed. If a sub-network using a new protocol is added to the home network illustrated in FIG. 1, a relay apparatus relaying between the sub-network using the new protocol and the IEEE802.11 network 110 is needed. In addition, a relay apparatus relaying between the sub-network using the new protocol and the network relay apparatus 130 is needed. Consequently, the above-described solution is complicated and has many limitations.

Meanwhile, in a method where the LLC layer is configured in a software manner, the limitations are decreased. However, keeping separate NICs for different network standards, respectively, needs more expenses than installing the modem hardware. Moreover, whenever a sub-network using a new protocol is added to an existing home network, an appropriate NIC is purchased, and software for driving the NIC is additionally installed and reset.

As described above, configuring a network relay apparatus with conventional technology needs a large amount of cost and causes inconvenience to normal users who are not skilled in the art.

SUMMARY OF THE INVENTION

The present invention provides a network relay apparatus and method for easily supporting various network protocols and a new network protocol.

The above stated aspect as well as other aspects of the present invention will become clear to one skilled in the art upon review of the following description, the attached drawings and appended claims.

According to an aspect of the present invention, there is provided a network relay apparatus including a first modem unit communicating with a first network using a first protocol, a second modem unit communicating with a second network using a second protocol, a bridge unit converting data to be suitable for the first and second protocols when the data is exchanged between the first modem unit and the second modem unit, and a controller generating the first and second modem units and the bridge unit in a software manner.

According to another aspect of the present invention, there is provided a network relay method including providing a first modem unit to decode a signal received from a first network using a first protocol, providing a bridge unit to convert the decoded signal to be suitable for a second protocol, and providing a second modem unit to code the converted signal and transmit the coded signal to a second network using the second protocol, wherein the first modem unit, the second modem unit, and the bridge unit are generated in a software manner.

BRIEF DESCRIPTION OF THE DRAWINGS

The above and other features and advantages of the present invention will become more apparent by describing in detail exemplary embodiments thereof with reference to the attached drawings in which:

FIGS. 5A and 5B illustrate software codes for the configurations of a bridge unit and a modem unit, respectively, according to an exemplary embodiment of the present invention.

DETAILED DESCRIPTION OF EXEMPLARY EMBODIMENTS OF THE PRESENT INVENTION

Figure 1:
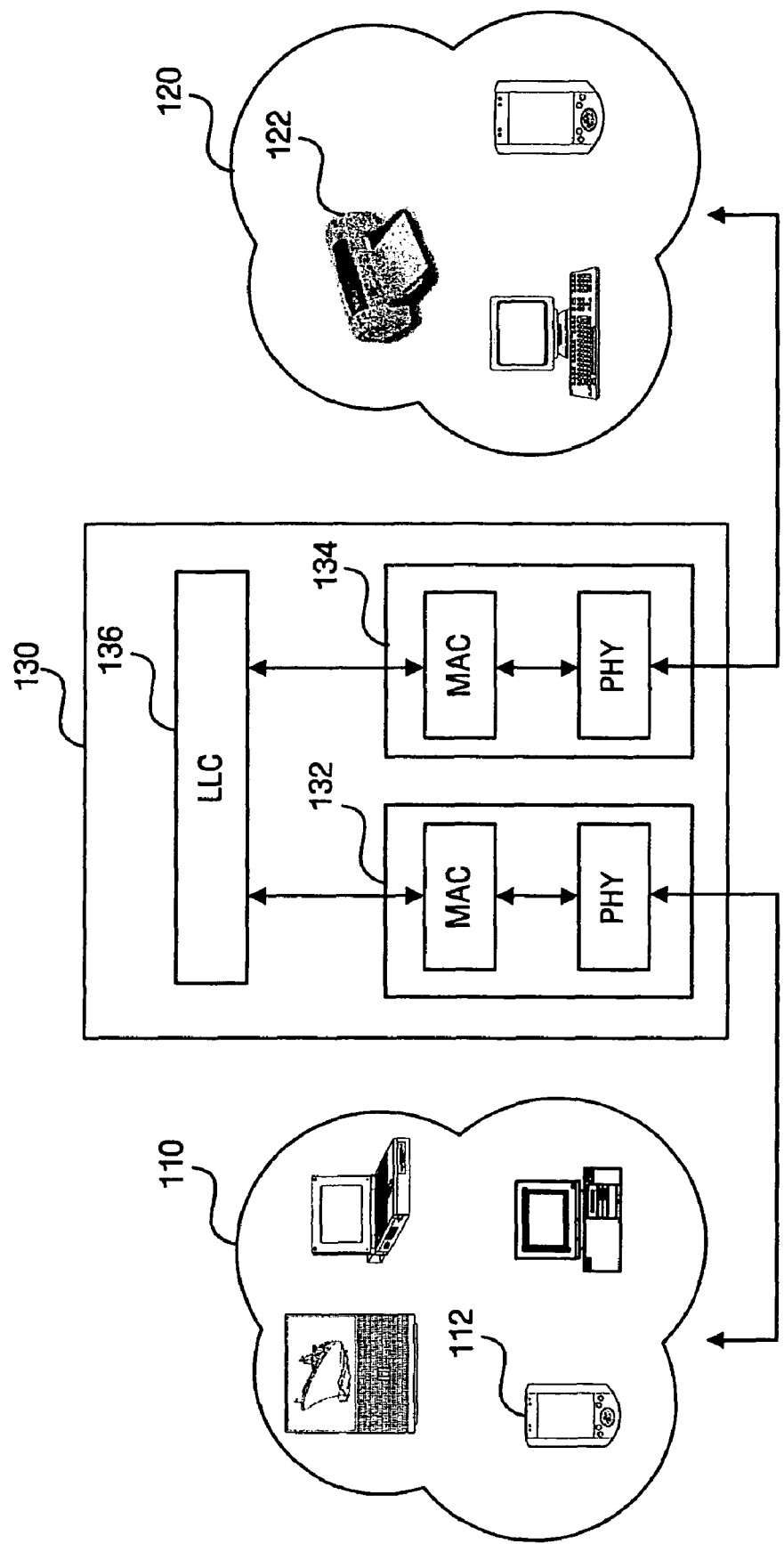
FIG. 1 illustrates an example of a home network including two different sub-networks.

The features of the present invention and methods for accomplishing the same will now be described more fully with reference to the accompanying drawings, in which exemplary embodiments of the invention are shown. This invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. In the drawings, the thickness of layers is exaggerated for clarity, and the same reference numerals in different drawings represent the same respective elements.

The present invention will now be described more fully with reference to the accompanying drawings, in which an exemplary embodiment of the invention is shown.

Figure 2:
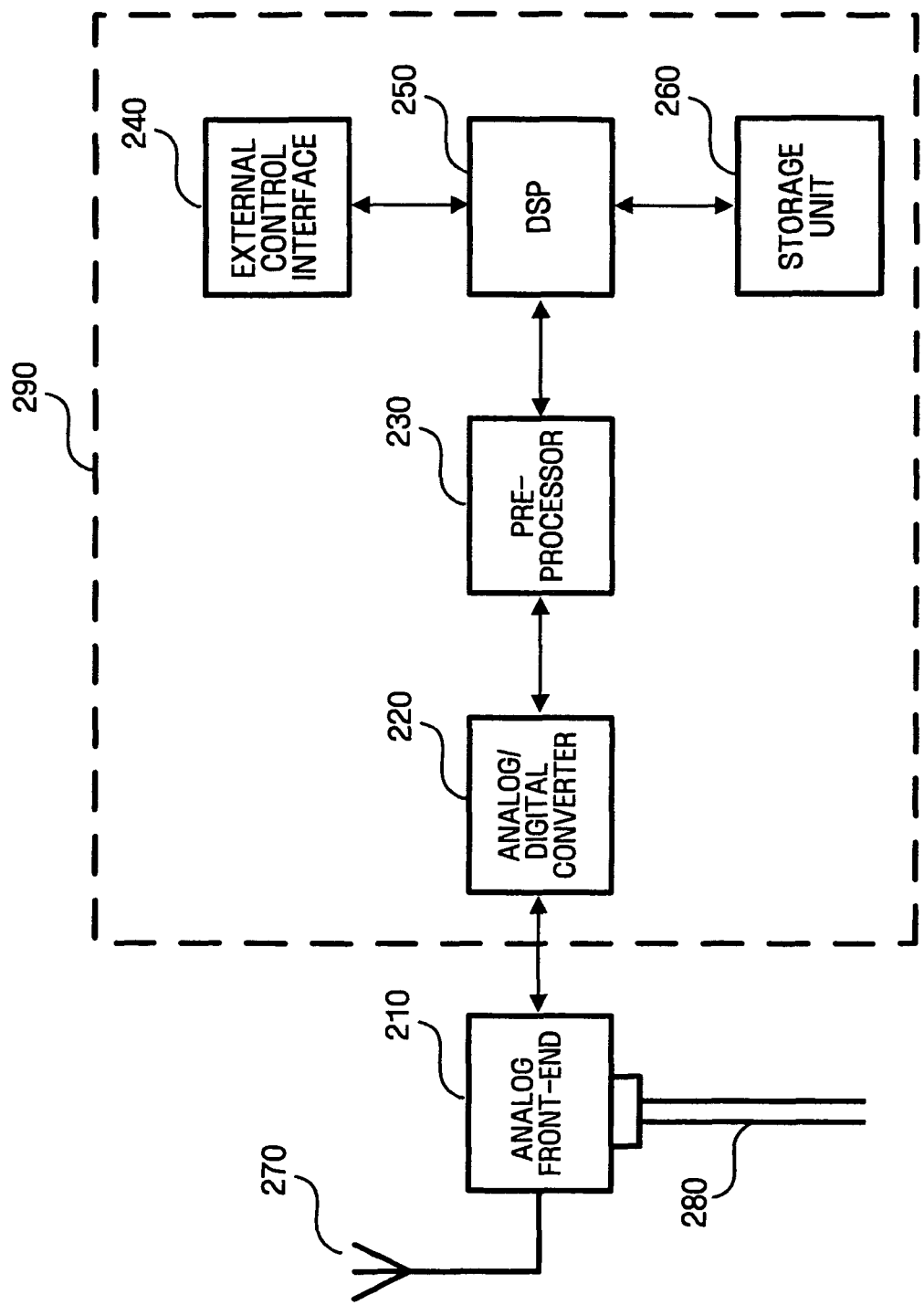
FIG. 2 is a block diagram of a network relay apparatus according to an exemplary embodiment of the present invention.

FIG. 2 is a block diagram of a network relay apparatus according to an exemplary embodiment of the present invention.

Referring to FIG. 2, the network relay apparatus according to an exemplary embodiment of the present invention includes an analog front-end 210 and a main processing unit 290. The analog front-end 210 directly contacts a physical communication medium and transmits and receives analog signals. The main processing unit 290 analyzes a signal received via the analog front-end 210 and processes data for a network relay.

The main processing unit 290 includes an analog/digital converter 220, a pre-processor 230, a digital signal processor (DSP) 250, a storage unit 260, and an external control interface 240. The analog/digital converter 220 performs conversion between an analog signal and a digital signal. The pre-processor 230 partially performs signal processing in cooperation with the DSP 250. The DSP 250 configures a software modem according to necessity to relay a signal between networks. The storage unit 260 stores program files needed to implement a signal processor required to configure the software modem. The external control interface 240 allows a user or an external host to remotely control the network relay apparatus.

Specifically, the analog front-end 210 directly contacts a physical communication medium, for example, a wired medium 280 such as an Ethernet cable or a power line or a wireless medium, and transmits and receives analog signals. The analog front-end 210 may include an antenna 270 for a wireless medium.

The analog front-end 210 attenuates a received radio frequency (RF) signal to an immediate frequency (IF) signal having a low frequency, extracts a baseband signal from the IF signal, and outputs the baseband signal to the main processing unit 290. In addition, the analog front-end 210 amplifies a baseband signal output from the main processing unit 290 to an IF signal, generates an RF signal by modulating the IF signal with a carrier wave, and outputs the RF signal to the physical communication medium. However, the present invention is not restricted thereto. The analog front-end 210 may perform direct conversion between an RF signal and a baseband signal by using a direct conversion method such as Zero-IF.

A network relay apparatus according to another exemplary embodiment of the present invention may include one or more analog front-ends and can support a plurality of sub-networks at a time.

The analog/digital converter 220 converts an analog signal received from the analog front-end 210 into a digital signal or a digital signal to be output to an external communication medium into an analog signal.

The pre-processor 230 performs signal processing that is part of a signal processing procedure to be performed by the DSP 250. For example, the pre-processor 230 may perform filtering, waveform shaping, and decimation on a digital signal output from the analog/digital converter 220 or the DSP 250.

Since part of a signal processing procedure for a network relay is preliminarily performed by the pre-processor 230, a signal processing burden on the DSP 250 can be reduced. In addition, the network relay apparatus can process a large amount of data at a high speed in real time. The pre-processor 230 can be easily implemented using common technology such as field programmable gate arrays (FPGA) technology. In an exemplary embodiment of the present invention, program files for executing signal processing operations of the pre-processor 230 may be dynamically downloaded and reconstructed so that a signal processing logic of the pre-processor 230 can be changed to be suitable for modem operations corresponding to a protocol to be supported.

The DSP 250 analyzes and appropriately transforms a data packet received from a network using a particular protocol so that the data packet can be transmitted to another network using a different protocol. For this operation, the DSP 250 may include a modem unit (not shown) and a bridge unit (not shown). The modem unit and the bridge unit are a set of one or more signal processors implemented by program files loaded from the storage unit 260. Instead of the DSP 250, a hardware or a software block that can process a digital signal may be used to make a network relay apparatus according to an exemplary embodiment of the present invention. The DSP 250 will be described in detail with reference to FIG. 3 later.

The storage unit 260 may be a permanent memory device such as a flash memory device or a hard disk and stores program files allowing various signal processors to be implemented in a software manner. The program files are selectively loaded to the DSP 250 according to a request of the DSP 250. The DSP 250 executes the loaded program files to implement various signal processors. Each of the signal processors implemented by the program files performs signal processes such as fast Fourier transform (FFT), carrier sense multiple access with collision avoidance (CSMA/CA), quadrature phase shift keying (QPSK), infinite impulse response (IIR) filtering, and finite impulse response (FIR) filtering, which are needed to perform modem functions.

The DSP 250 can generate a modem unit by combining such signal processors. The program files used to implement various signal processors in a software manner may be made in a programming language such as the C language and stored in the storage unit 260 in a form of a compiled object file.

Accordingly, a signal processor implemented by loading program files can be reused to generate one or more modem units and can be used for different modem units at the same time.

In addition, part of the program files may be used to configure or change the signal processing logic of the pre-processor 230. The storage unit 260 may further store a basic input output system (BIOS) or an operating system (OS) for driving the DSP 250 and program files for generating a bridge unit.

The external control interface 240 provides an interface such as an Ethernet interface or RS232 serial communication interface to allow an external host to remotely control the network relay apparatus. The network relay apparatus can dynamically download, via the external control interface 240, information regarding a combination of various signal processors needed to make a modem unit suitable for a particular protocol, program files for implementing each signal processor in a software manner, and information on a signal processing logic of the pre-processor 230.

Figure 3:
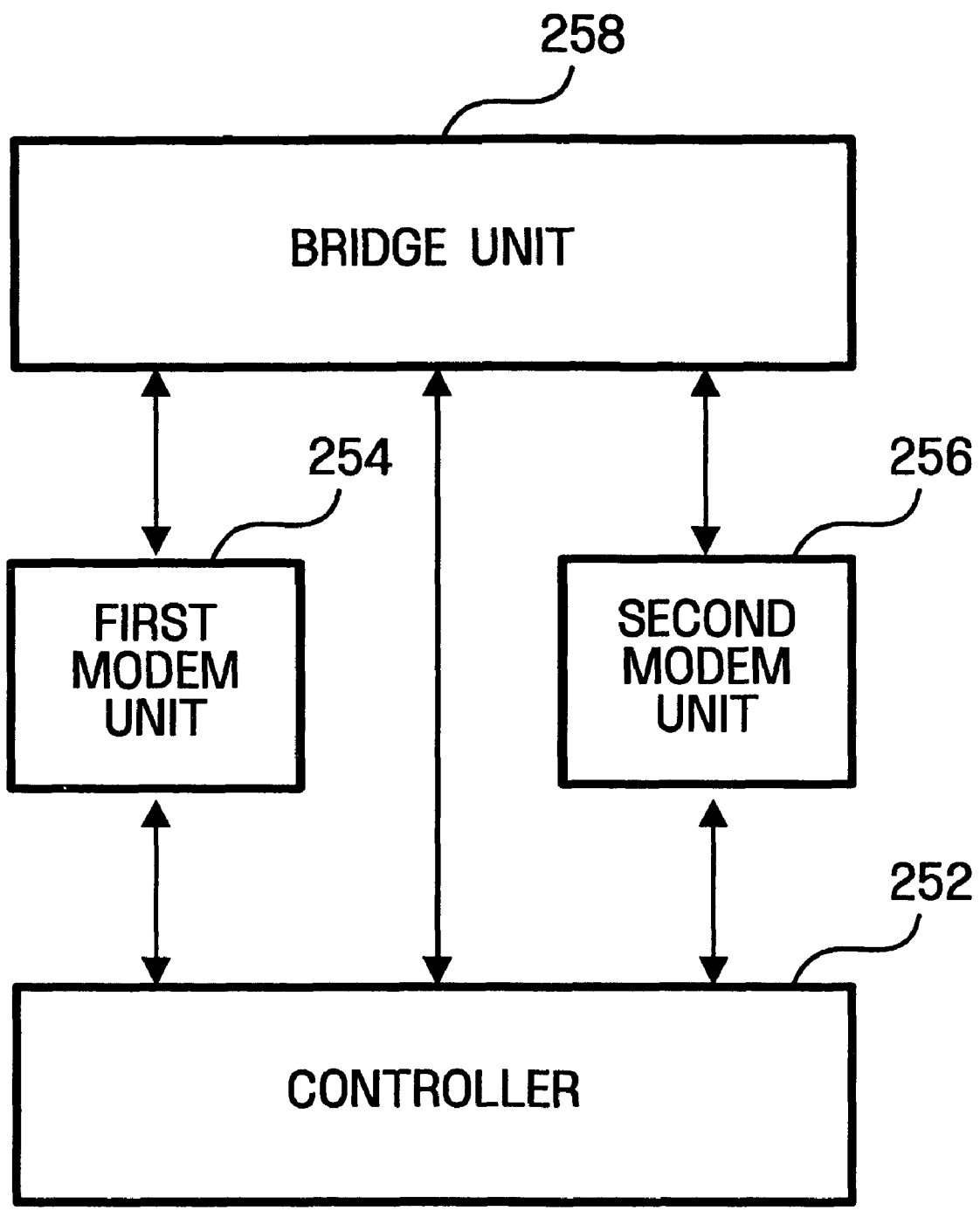
FIG. 3 is a block diagram of a digital signal processor (DSP) according to an exemplary embodiment of the present invention.

FIG. 3 is a block diagram of the DSP 250 according to an exemplary embodiment of the present invention.

The DSP 250 includes a first modem unit 254 performing communication with a network using a first protocol, a second modem unit 256 performing communication with a network using a second protocol, a bridge unit 258 converting data exchanged between the first and second modem units 254 and 256 to be suitable for the first and second protocols, and a controller 252 generating and managing the first and second modem units 254 and 256 and the bridge unit 258.

The controller 252 loads program files from the storage unit 260 to implement various signal processors in a software manner and generates the first and second modem units 254 and 256 using particular network protocols, respectively, by making sets of signal processors. Information on a set of signal processors needed to generate each of the first and second modem units 254 and 256 may be set by a user or may be acquired from an external host via the external control interface 240.

Similarly, the controller 252 can configure or change the signal processing logic of the pre-processor 230 by executing one or more program files.

In addition, the controller 252 can generate the bridge unit 258 in a software manner. The bridge unit 258 functioning as a logical link control (LLC) layer of the network relay apparatus may be implemented in a software manner using conventional technology.

Besides, the controller 252 may store the configurations of the generated modem units and bridge unit 254, 256, and 258, respectively, so that when the network relay apparatus is booted or reset, the existing modem units and bridge unit 254, 256, and 258 can be driven without a user's or external host's instruction.

The first and second modem units 254 and 256 function as a physical (PHY) layer and a medium access control (MAC) layer of the network relay apparatus and are generated in a software manner by the controller 252. If a particular network protocol to be relayed by the network relay apparatus is set, each of the first and second modem units 254 and 256 may be implemented by a set of signal processors needed to perform communication with a network using the particular network protocol. Information on a set of signal processors needed to generate each of the first and second modem units 254 and 256 and information on a data route (i.e., a signal processing sequence) among signal processors may be acquired from an external host or may be set by a user.

Program files needed to implement each of the signal processors constituting a single modem unit in a software manner are stored in the storage unit 260. When another modem unit for a new protocol is added, information on a set of signal processors needed to generate the new modem unit and program files for implementing the signal processors may be received via the external control interface 240 and stored in the storage unit 260.

According to a user's setting, two or more modem units may be generated so that a relay between multiple network pairs can be supported by a single network relay apparatus.

The bridge unit 258 is a software module including bridge functions and converts data exchanged between networks supported by the first and second modem units 254 and 256 to be suitable for protocols respectively used by the networks. Here, the bridge unit 258 may perform address mapping for data exchange between the networks using an address mapping table of network devices included in each network. In addition, the bridge unit 258 functions as the LLC layer of the network relay apparatus by storing/transmitting data.

The bridge unit 258 may be generated in a software manner by the controller 252. The bridge 258 may be implemented in a software manner using conventional technology.

Figure 4:
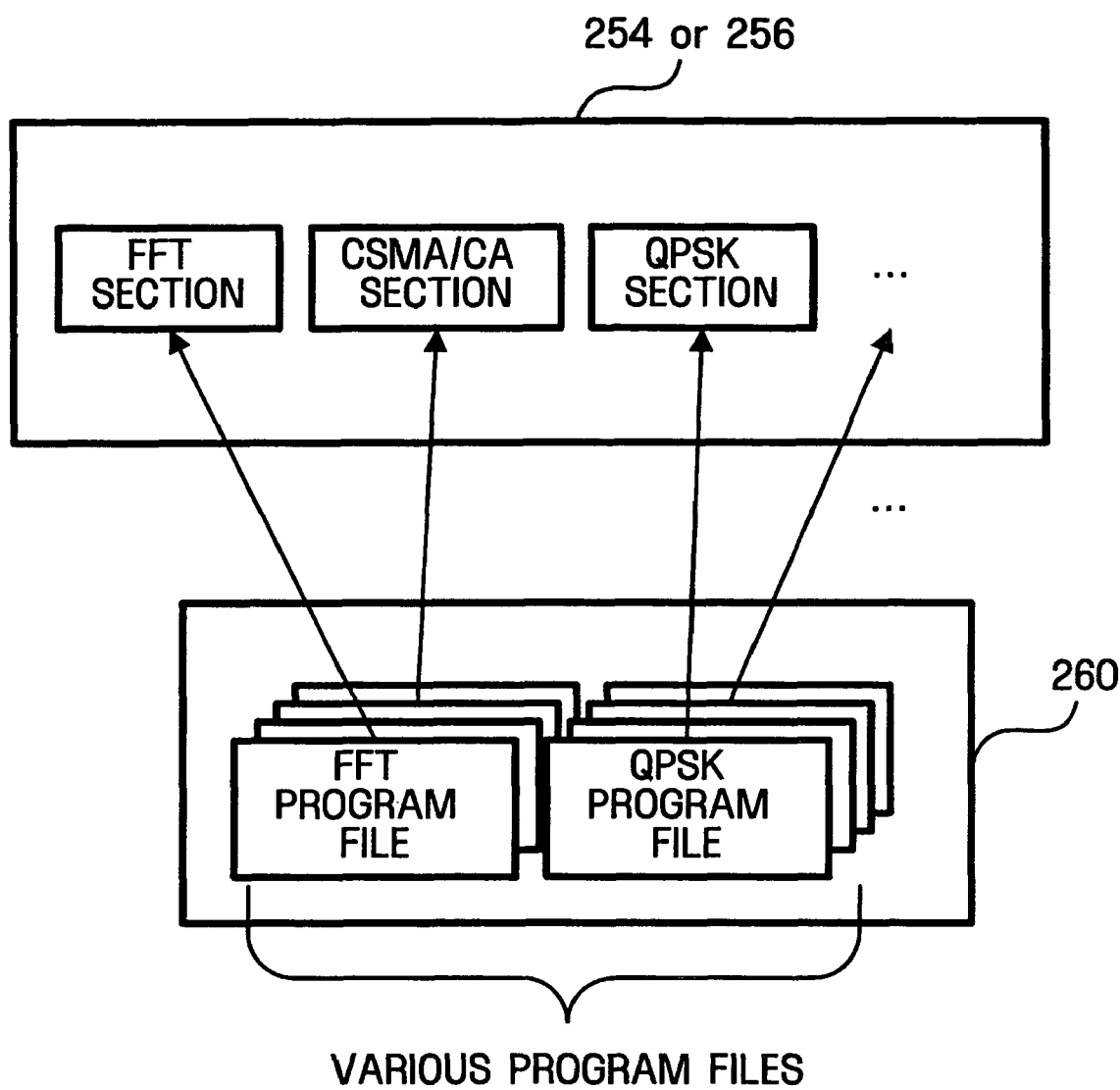
FIG. 4 is a block diagram of a modem unit according to an exemplary embodiment of the present invention.

FIG. 4 is a block diagram of the modem unit 254 or 256 according to an exemplary embodiment of the present invention. The modem unit 254 or 256 may be comprised of signal processors performing various signal processes needed to execute modem functions. Examples of a signal processor include an FFT section, a CSMA/CA section, and a QPSK section. Accordingly, a function of the modem unit 254 or 256 can be accomplished by a series of signal processes performed by one or more signal processors.

Information on a set of signal processors needed to constitute a particular modem and a program file for implementing a signal processor in a software manner are stored in the storage unit 260. The information and the program file may be dynamically downloaded from an external host according to necessity.

Accordingly, a signal processor implemented by a program file can be reused to make one or more modem units and can be used for different modem units at the same time. For example, a filter such as an IIR filter or an FIR filter is essential to most modem functions and can be applied to various types of modems by appropriately adjusting values of necessary parameters when needed.

As described above, when a modem function is implemented not by a single software module but by one or more reusable signal processors, efficiency in using storage space of the network relay apparatus can be increased and various network protocols can be quickly and easily supported.

FIG. 5A illustrates a software code for the configuration of a bridge unit according to an exemplary embodiment of the present invention.

"BRIDGE_MODULE brg_802_3_802_11b" describes two target modems and packet queues which constitute a bridge. The software code configures a bridge unit relaying between a network using an Institute of Electrical and Electronics Engineers (IEEE)802.3 protocol and a network using an IEEE802.11b protocol.

A function initialize( ) is called once by the controller 252 in an initial stage and calls an initialization function of a target modem unit to perform modem initialization.

A function work( ) contains the logic to perform the bridge function such as converting an address, storing/transmitting a packet.

FIG. 5B illustrates a software code for the configuration of a modem unit according to an exemplary embodiment of the present invention.

In the software code, a function "mdm_ieee_802_11b::setup( )" is an initialization function for an IEEE802.11b modem and is implemented by signal processors including a digital sample source section, an FIR section for channel filtering, a QPSK demodulation section, and a CSMA/CA MAC section. In addition, CONNECT_MODULE( ) lines describe data flow among signal processors. Accordingly, a sequence of signal processes needed to perform a particular modem function is acquired. Information on a set of one or more signal processors needed to constitute a particular modem unit and information on a data route (i.e., a signal processing sequence) among signal processors may be acquired from an external host or may be set by a user.

A program file for implementing a signal processor may be made in a programming language such as the C language and may be present in a form of a compiled object file. Such program files are loaded from the storage unit 260 according to control of the controller 252 during setup of a modem unit.

Figure 6:
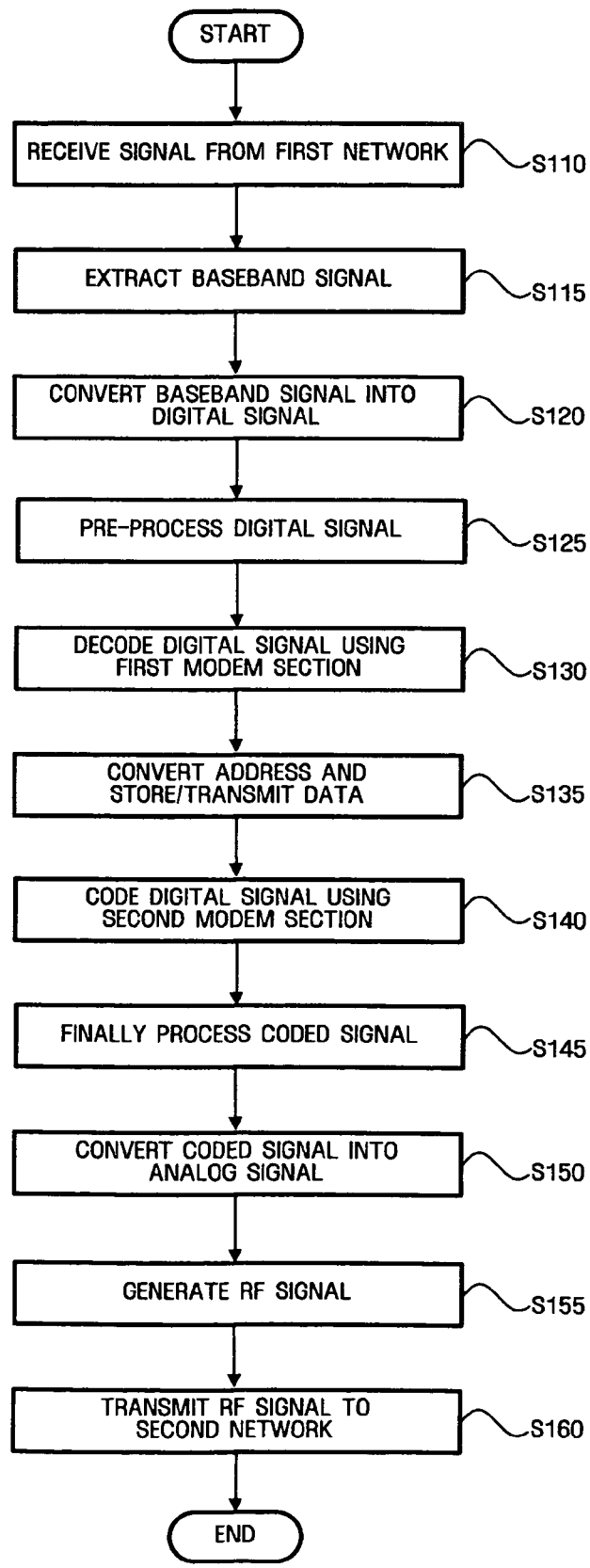
FIG. 6 is a flowchart of a network relay method according to an exemplary embodiment of the present invention.

FIG. 6 is a flowchart of a network relay method according to an exemplary embodiment of the present invention.

In operation S110, the analog front-end 210 receives a signal to be transmitted to a second network using a second protocol from a first network using a second protocol. In operation S115, the analog front-end 210 extracts a baseband signal from the received signal.

In operation S120, the extracted baseband signal is input to the analog/digital converter 220 and converted into a digital signal.

In operation S125, the pre-processor 230 receives the digital signal from the analog/digital converter 220 and performs part of a signal processing procedure to be performed by the DSP 250 with respect to the digital signal. For example, the pre-processor 230 may perform filtering, waveform shaping, and decimation on the digital signal output from the analog/digital converter 220.

Since the part of a signal processing procedure for a network relay is preliminarily performed by the pre-processor 230, a signal processing burden on the DSP 250 can be reduced. As a result, a network relay apparatus can process a large amount of data at a high speed in real time.

In operation S130, the digital signal pre-processed by the pre-processor 230 is decoded by the first modem unit 254. The first modem unit 254 analyzes data conforming to the first protocol to communicate with the first network and is generated in a software manner by the controller 252.

When the first protocol used by the first network, from which the network relay apparatus receives a signal to relay, is set, the first modem unit 254 may be generated by forming a set of signal processors needed to perform communication with the first protocol. Information on the set of signal processors needed to generate the first modem unit 254 and information on a data route (i.e., a signal processing sequence) among the signal processors may be set by a user or an external host.

Program files necessary for implementing, in a software manner, the signal processors constituting the first modem unit 254 are stored in the storage unit 260 and may be downloaded via the external control interface 240 when needed. The generation of a modem unit has been described in detail above with reference to FIGS. 3 and 4 and an explanation thereof will not be given.

In operation S135, a signal processed by the first modem unit 254 is transmitted to the bridge unit 258 and converted for a network relay. The bridge unit 258 is a software module including bridge functions and converts data exchanged between networks respectively supported by the first and second modem units 254 and 256 to be suitable for protocols respectively used by the networks. Here, the bridge unit 258 may perform address mapping for data exchange between the networks using an address mapping table of network devices included in each network. In addition, the bridge unit 258 functions as an LLC layer of the network relay apparatus by storing/transmitting data.

In operation S140, data converted by the bridge unit 258 is coded by the second modem unit 256. The second modem unit 256 analyzes data conforming to the second protocol to communicate with the second network and is generated in a software manner by the controller 252.

The second modem unit 256 may be generated in a similar manner to the first modem unit 254. Generation of a modem unit has been described above.

In operation S145, a coded signal output from the second modem unit 256 is finally processed by the pre-processor 230. The functions of the pre-processor 230 have been described above.

In operation S150, the coded signal processed by the pre-processor 230 is converted into an analog baseband signal by the analog/digital converter 220.

The analog front-end 210 generates an RF signal including the analog baseband signal output from the analog/digital converter 220 in operation S155 and transmits the RF signal to the second network in operation S160.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

As described above, according to the exemplary embodiments of present invention, various network protocols and new network protocols can be easily supported.

What is claimed is:

1. A network relay apparatus comprising:
a storage unit configured to store program files that are configured to implement one or more signal processors; and
a controller configured to selectively load program files for implementing the one or more signal processors needed to perform modem functions stored in the storage unit, and configured to dynamically create each of a first modem unit, a second modem unit and a bridge unit, wherein the first, second, and bridge units are generated via only software,
wherein each of the first modem unit and the second modem units is dynamically created by dynamically combining a pre-stored set of the one or more signal processors needed to perform modem functions,
wherein the one or more signal processors are generated via only software, and
wherein the first modem unit is configured to communicate with a first network using a first protocol, the second modem unit is configured to communicate with a second network using a second protocol, and the bridge unit is configured to convert data to be suitable for the first and second protocols when the data is exchanged between the first modem unit and the second modem unit.

2. The network relay apparatus of claim 1, wherein each of the one or more signal processors is one of reused to create one or more modem units and used for different modem units at a same time.

3. The network relay apparatus of claim 1, wherein the controller further creates at least one modem unit configured to communicate with a network using a protocol different from one of the first and second protocols.

4. A network relay method comprising:
decoding, by a first modem unit, a signal received from a first network using a first protocol;
converting, by a bridge unit, the decoded signal to be suitable for a second protocol; and
coding, by a second modem unit, the converted signal and transmitting, by the second modem unit, the coded signal to a second network using the second protocol,
wherein each of the first modem unit, the second modem unit, and the bridge unit are dynamically created via only software,
wherein each of the first modem unit and the second modem units is dynamically created by dynamically combining a pre-stored set of one or more signal processors needed to perform modem functions, wherein the one or more signal processors are generated via only software by selectively loading program files for implementing the one or more signal processors needed to perform the modem functions stored in a storage unit.

5. The network relay method of claim 4, wherein each of the one or more signal processors is one of reused to create one or more modem units and used for different modem units at a same time.

6. The network relay apparatus of claim 1, wherein one of the one or more signal processors is at least at least a Fourier transform (FFT) processor, a carrier sense multiple access with collision avoidance (CSMA/CA) processor, or a quadrature phase shift keying (QPSK) processor.

7. The network relay method of claim 4, wherein one of the one or more signal processors is at least at least a Fourier transform (FFT) processor, a carrier sense multiple access with collision avoidance (CSMA/CA) processor, or a quadrature phase shift keying (QPSK) processor.

* * * * *